US 6,698,634 B2

(12) United States Patent
Thomson (10) Patent No.: US 6,698,634 B2
(45) Date of Patent: Mar. 2, 2004

(54) VEHICLE MOUNTED CAMPING UNIT

(76) Inventor: Stephan Thomson, 2122 E. Hubbard Ave., Salt Lake City, UT (US) 84108

(*) Notice: Subject to any disclaimer, the term of this patent is extended or adjusted under 35 U.S.C. 154(b) by 96 days.

(21) Appl. No.: 10/124,838

(22) Filed: Apr. 17, 2002

(65) Prior Publication Data

US 2003/0197043 A1 Oct. 23, 2003

(51) Int. Cl.$^7$ .............................................. B60R 11/00
(52) U.S. Cl. ....................... 224/404; 224/510; 224/542; 296/37.6
(58) Field of Search ................................ 224/281, 404, 224/510, 542, 554; 296/37.1, 37.6; 280/727

(56) References Cited

U.S. PATENT DOCUMENTS

| | | | |
|---|---|---|---|
| 2,784,027 A | * 3/1957 | Temp | 224/404 |
| D271,009 S | 10/1983 | Fishler | |
| 4,573,731 A | * 3/1986 | Knaack et al. | 224/542 |
| 4,733,898 A | * 3/1988 | Williams | 224/404 |
| D298,112 S | 10/1988 | Hall | |
| 4,824,158 A | * 4/1989 | Peters et al. | 296/37.6 |
| 4,830,242 A | * 5/1989 | Painter | 224/542 |
| 5,456,511 A | 10/1995 | Webber | |
| 5,513,941 A | 5/1996 | Kulas et al. | |
| 5,649,731 A | 7/1997 | Tognetti | |
| 5,669,655 A | 9/1997 | Hammond | |
| 5,683,157 A | 11/1997 | Peterson et al. | |
| 5,685,593 A | 11/1997 | O'Connor | |
| 5,820,190 A | 10/1998 | Benner | |
| 5,931,632 A | 8/1999 | Dongilli et al. | |
| 5,964,492 A | * 10/1999 | Lyon | 224/404 |
| 6,082,804 A | * 7/2000 | Schlachter | 224/281 |
| 6,152,341 A | 11/2000 | LeMay et al. | |
| 6,164,508 A | 12/2000 | van Veenen | |
| 6,170,502 B1 | 1/2001 | Pullen | |
| 6,174,012 B1 | * 1/2001 | Saffold | 224/404 |
| 6,279,801 B1 | 8/2001 | Harrison | |
| 6,305,739 B1 | 10/2001 | Corona | |
| 6,308,873 B1 | * 10/2001 | Baldas et al. | 224/404 |
| 6,312,034 B1 | 11/2001 | Coleman, II et al. | |
| 6,318,781 B1 | * 11/2001 | Mc Kee | 296/37.6 |
| 6,328,364 B1 | 12/2001 | Darbishire | |
| 6,491,331 B1 | * 12/2002 | Fox | 224/510 |

FOREIGN PATENT DOCUMENTS

JP          2-254043       * 10/1990       ................ 224/554

OTHER PUBLICATIONS

Author unknown, www.innovativeindustriesinc.com, "Innovative Industries Inc. Home Page", website home page last updated Jan. 5, 2002, pp. 1–2.
Author unknown, www.innovativeindustriesinc.com/Slide MasterHome.htm, "Slide Master Home Page", Jan. 2002, pp. 1–3.

* cited by examiner

Primary Examiner—Gary E. Elkins
(74) Attorney, Agent, or Firm—Weide & Miller, Ltd.

(57) ABSTRACT

A camping unit is mounted for transport by a vehicle,. The unit having first and second spaced side units defining an opening there between. A top extends over the opening. A moving compartment is mounted for movement from a position in which it is located in the opening between the side units and under the top, to a position in which at least a portion of it extends outwardly of the side units. The side units and moving compartment all define interior areas or compartments for storing equipment and other goods. The camping unit is adapted to be located in the bed of a vehicle, with the moving compartment mounted upon rails for sliding outwardly of the bed. In one embodiment, the camping unit includes electrical, water and sound systems. Various equipment support platforms, compartment/storage doors and other features are provided.

20 Claims, 5 Drawing Sheets

VEHICLE MOUNTED CAMPING UNIT

FIELD OF THE INVENTION

The present invention relates to a camping unit, and more particularly to such a unit which is adapted to be mounted to a vehicle.

BACKGROUND OF THE INVENTION

Camping and other outdoor activities, such as fishing and hiking, are frequently engaged in by a large number of the population. Over time, a wide variety of devices have been developed to make these activities more convenient. Unfortunately, these devices all suffer from a variety of drawbacks.

For example, there are presently two main ways to transport camping and related equipment. First, a person may obtain a trailer or a self-contained camping unit (frequently called "RVs"). Generally, these units provide shelter and storage, generally including a bed and sometimes a toilet and cooking facilities. On the other hand, these units are generally large and expensive. For example, in the case of a recreational vehicle or RV, the vehicle is generally specifically configured for providing shelter and is self-contained. The vehicle is not suitable for everyday driving, such as commuting. In addition, RV's are generally very heavy and large, and can not be driven on many roads, and certainly not off-road.

Alternatively, campers and other recreationalists may simply load a variety of gear into their car or truck. This gear may include a tent, camp stove, sleeping bag, food and the like. Generally, every time these parties go camping or the like they must locate the equipment in their home, such as in closets or their garage, and load it into their vehicle. When they reach their destination, they find and unload the equipment element by element. This system has the drawback that the equipment is not organized, and must be selectively loaded and unloaded for every camping or other trip or event.

A method and device for use in solving these problems is desired.

SUMMARY OF THE INVENTION

The present invention comprises a camping or storage unit, and more specifically such a unit which is adapted to be mounted to a vehicle. In one embodiment, the storage unit comprises a camping unit which is adapted to store camping or other recreational equipment and provide other amenities.

One embodiment of a storage unit of the invention comprises camping unit adapted to be mounted to a vehicle for transport. The storage unit includes a first side unit defining at least one generally enclosed compartment. The first side unit has a front end and a rear end defining at least one access door located at the rear end for accessing the interior of the area. The storage unit also includes a second side unit defining at least one generally enclosed compartment. The second side unit also has a front end and a rear end and at least one access door located at the rear end for accessing the interior of the area. The first and second side units are spaced from one another and define an opening there between. In one embodiment, a top extends over the opening between said first and second side units. The storage unit also includes a sliding compartment. In one embodiment, the sliding compartment is mounted upon at least one rail, permitting the sliding compartment to be moved from a first position in which the sliding compartment is located within the opening below the top and between the first and second side units, and a second position in which at least a portion of the sliding compartment is moved outwardly of the opening.

In one embodiment, the sliding compartment defines at least one generally enclosed space or compartment and has a front end and a rear end. At least a portion of the rear end of said sliding compartment is movable from a first position in which access to the interior area is inhibited, and a second position in which access to the interior area is permitted.

In one embodiment, the rear end of the sliding compartment comprises a hinged gate rotatable from an upwardly extending position in which it closes or prevents access to an interior area of the sliding compartment to a second outwardly extending position in which the gate forms a support surface and permits access to the interior area. In one embodiment, the sliding compartment includes a first side and an opposing second side and at least one drawer associated with each of the sides, said drawers in a first position located within the interior area and in a second position extending at least partially therefrom for access thereto.

In one embodiment, the sliding compartment has a top, at least a portion of which is formed as a removable panel permitting access to the interior area. The removable panel may be located adjacent to the rear end of the sliding compartment.

The storage unit may include one or more platforms which may be extended therefrom for resting equipment upon. In one embodiment, at least one platform is located in the interior area of the sliding compartment, the platform extendable outwardly of the rear end of the sliding compartment.

In one embodiment, the storage unit includes an electrical system, the electrical system including at least one battery. The battery may be located in the generally enclosed compartment of either the first or second side area. The storage unit may also include a sound system. In one embodiment, the sound system includes a head unit powered by the electrical system, the head unit mounted to the rear end of either the first or second side areas. The head unit may provide a signal to at least one speaker located adjacent to the head unit. In one embodiment, the storage unit also includes a water system, the water system including a storage container having an inlet and outlet, and preferably a pump powered by the electrical system for providing water from the container to the outlet. The outlet may comprise a shower head or spray nozzle.

In a preferred configuration, the storage unit is adapted to fit within the bed of a vehicle, with the first and second side units and sliding compartment having a length approximately the same as a length of the bed and the sliding compartment movable to a position in which its rear end is located outwardly of a rear end of the bed. In an embodiment where the bed of the vehicle includes upwardly protruding wheel-wells, the first and second side areas include upwardly extended recessed areas for accepting the wheel-wells. In one embodiment of the invention, the sliding compartment is mounted to at least one first pair of rails, those rails slidably mounted to at least one mating second pair of rails connected to the bed of the vehicle. A latching mechanism is adapted to selectively maintain the sliding compartment in the first position within the opening.

In another embodiment, the storage unit may be mounted to other vehicles or devices, such as a trailer having a tongue for connection to a hitch and at least two supporting wheels.

As another aspect of the invention, the storage unit may be mounted in the bed of a vehicle under a camper or cover shell. In this embodiment, the top of the unit may serve as a sleeping berth. As another additional aspect of the invention, a shelter is provided for selectively covering the unit, and especially the sliding compartment, such as when extended beyond the bed of the vehicle. In one embodiment the shelter comprises a cover mounted to an upwardly extending frame.

Various embodiments of the storage or camping unit of the invention are contemplated. For example, the first and second side units or areas may have a generally enclosed area which defines a plurality of areas, some of which are more enclosed than others. Likewise, in one embodiment, a rear portion of the interior of the sliding compartment may be accessible through a large side opening, such as for accepting large items therein.

In accordance with the invention there is provided a transportable storage unit which provides a wide variety of features to the recreationalist, and which overcomes the above-stated problems.

Further objects, features, and advantages of the present invention over the prior art will become apparent from the detailed description of the drawings which follows, when considered with the attached figures.

DETAILED DESCRIPTION OF THE INVENTION

The invention is a vehicle mounted or mountable camping unit. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention is a vehicle mounted camping unit. The term "camping" unit is used herein for descriptive purposes, since the unit is particularly well-suited to use for camping purposes. The invention may be referred to by other terms, such as "storage" unit or the like, it being understood that the invention may be used for a wide variety of purposes and the name of the unit is not limiting of the scope of the invention.

As described in detail below, the camping unit is configured to mount to and be transported by a vehicle. More specifically, the unit is preferably adapted to be mounted to or positioned in the bed of a truck. In other embodiments, the camping unit is mountable to a trailer. Thus, the term "vehicle" is meant to include any mobile means of transport, including cars, trucks, trailers and the like.

In general, the camping unit is configured to provide for the storage and access of equipment, and to provide for convenient access and use of that equipment. As indicated, in one embodiment, the unit is specifically suited to use in conjunction with camping-related equipment. It will be appreciated, however, that the unit may be used with a variety of equipment and for a variety of purposes, and as such could be referred to by other terminology while not changing the scope of the invention.

Figure 1:
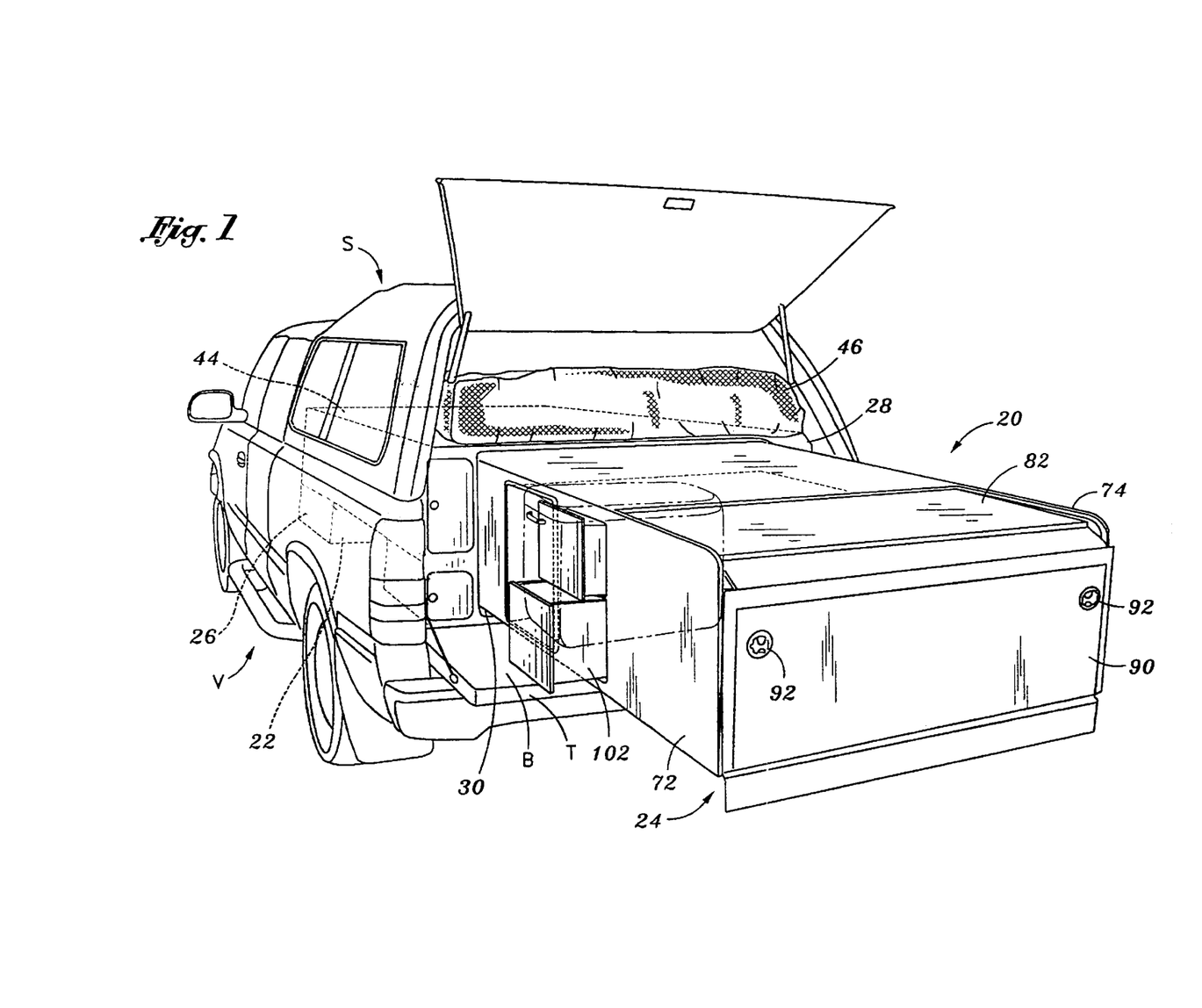
FIG. 1 is a rear perspective view of a vehicle having a bed and covering shell, a tailgate of the vehicle illustrated in a lowered position and a window of the shell illustrated in a raised position, and illustrating a camping unit in accordance with the invention located in the bed of the vehicle, a sliding compartment of the camping unit illustrated in an extended position.

One embodiment of a camping unit 20 in accordance with the invention is illustrated in FIG. 1. As illustrated, the camping unit 20 is designed to be transported by a vehicle V. In the illustrated example, the vehicle V is a pickup type truck having a bed B or similar compartment. In one embodiment, the vehicle V includes a shell S extending over the otherwise open top of the bed B. Such shells S are well known to those of skill in the art, such as those constructed of fiberglass. The shell S may have other forms, including simple canvas or fabric covers or the like. As also illustrated, in the embodiment illustrated the vehicle V includes a tailgate T which permits the end of the bed B to be selectively opened or closed. The camping unit 20 can be utilized with a vehicle V which does or does not include a tailgate T.

In one embodiment, the camping unit 20 comprises a base or stationary portion 22 and a moving or sliding portion or compartment 24. The base 22 is preferably adapted to be located in the bed B of the vehicle V at all times during use. When the camping unit 20 is not being used, as described in more detail below, however, the entire unit 20, including the base 22 may be removed from the vehicle V, freeing the bed B for other uses.

In one embodiment, the base or stationary portion 22 includes a first side unit area 26 and an opposing second side unit area 28. The first and second side units or areas 26,28 are located at either side of a central opening 30. In a preferred embodiment, the first and second side areas 26,28 are adapted to mount along each side of the bed B of the vehicle V. In one embodiment, each side area 26,28 defines at least one partially enclosed area, the purpose of which is detailed below.

In one embodiment, the first and second side areas 26,28 comprise a structure which defines one or more generally enclosed interior areas or compartments. The first and second side areas 26,28 may be constructed of a variety of materials and in a variety of manners.

As described below, the size and shape of the first and second side areas or units 26,28 may vary, including depending upon the vehicle to which the camping unit 20 is to be mounted. Generally, the first and second side units 26,28 are designed to extend along opposing sides of the bed B of the vehicle V. As is known, some vehicles V have a wheel-well which extends upwardly into the bed B. In one embodiment, each of the first and second side areas 26,28 include a recessed portion or area for accepting one of these wheel wells. In the event the vehicle V does not include such a wheel well, the side areas need not include recesses. Further, in the event the vehicle V has other elements protruding into the bed B, the side area 26,28 may be correspondingly configured.

Figure 2:
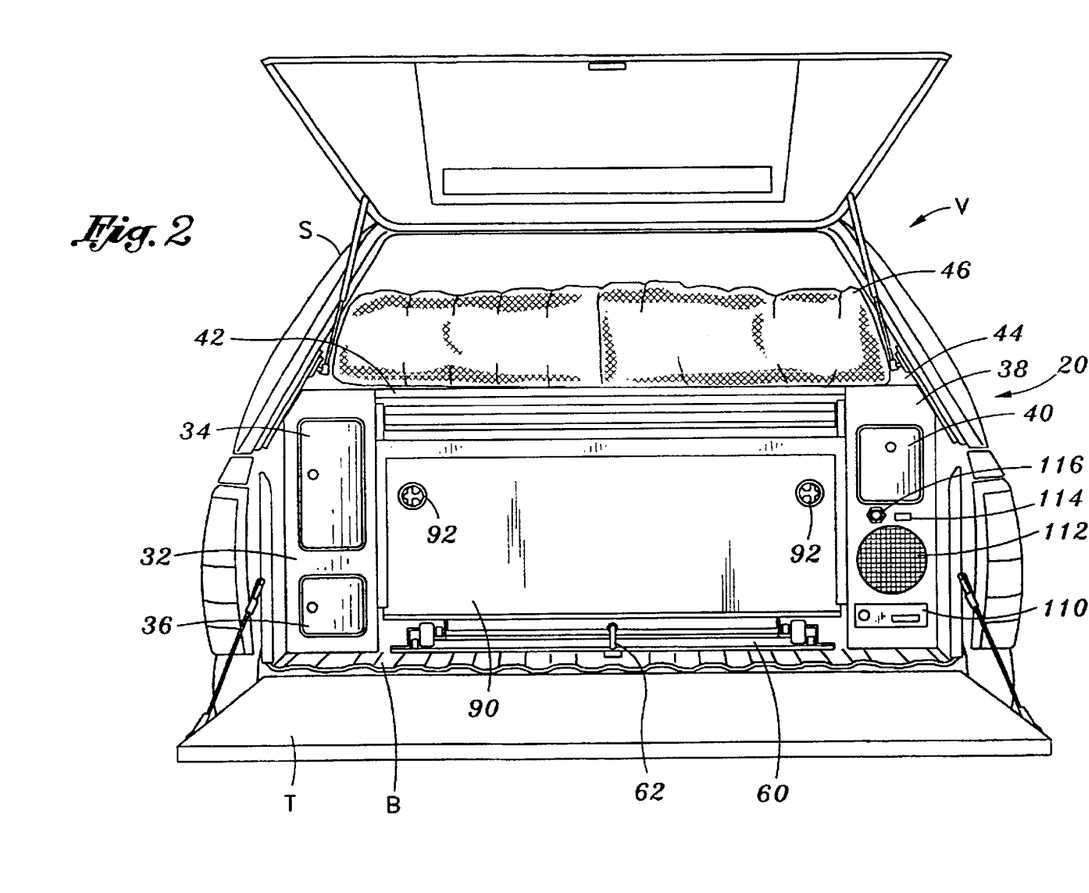
FIG. 2 is a rear plan view of the vehicle illustrated in FIG. 1 with the sliding compartment of the camping unit illustrated in a retracted or closed position.

Referring to FIGS. 1 and 2, in one embodiment, the first side area 26 has an end 32 which is located at the end of the bed B (i.e. adjacent the tailgate T when the tailgate is closed). This end 32 may be referred to as a "rear" end as it is accessible from the rear of the bed B of the vehicle V. In one embodiment, a first access door 34 and second access door 36 are provided in the end 32 of the first side area 26. The first and second access doors 34,36 selectively provide access into the one or more interior areas of the first side area 26. In one embodiment, the first side area 26 is divided into a plurality of compartments and each of the access doors 34,36 provides access to a different one of the compartments.

The first and second access doors 34,36 may be constructed in a variety of manners. Preferably, the doors 34,36 are connected to the first side area 26 by one or more hinges. The doors 34,36 can be connected in other manners. In one embodiment, each door 34,36 may include a lock for locking the door in a closed position preventing access to the interior area.

The first and second access doors 34,36 preferably provide selective access to one or more storage areas in which equipment, food or other items may be stored. In one embodiment, more than two doors or only a single door may be provided for this purpose.

Referring still to FIGS. 1 and 2, in one embodiment, the second side area 28 has an end 38 which is also located at the end of the bed B. This end 38 is also accessible from the rear of the bed B of the vehicle V. In one embodiment, the second side area 28 is divided into a plurality of interior compartments. As illustrated, in one embodiment, an access door 40 is provided for accessing these one or more interior areas. The door 40 may have a variety of configurations and may include a lock. In other embodiments, more than one door may be provided.

In one embodiment, one or more components are mounted to the end 38 of the second side area 28. This mounting provides support for the components and accessibility to the components at the end 38 of the second side area 28. These components are described in more detail below. In like manner, though not illustrated, components may similarly be mounted to and supported by the end 32 of the first side area 26.

In one embodiment, the opening 30 between the first and second side areas 26,28 is generally rectangular. In one embodiment, a support 42 extends over a top portion of the opening 30. As illustrated, the support 42 may be arranged so that a top surface of the support 42 is coplanar with a top surface of the first side area 26 and second side area 28, whereby a contiguous planar top surface 44 of the unit 20 is defined. In one embodiment, this support 42 and the top surface of the first and second side areas 26,28 may be constructed to be water tight. In one embodiment, the support 42 may extend over the entire unit 20, including the side areas. In one embodiment, so that the unit 20 is water-tight, a fabric cover or the like (especially if the shell S is not present) may be stretched over the unit 20.

In one embodiment, the first and second side areas 26,28 have a length approximately the same length as the bed B of the vehicle V. In one embodiment, this length is nearly 8 feet. In this configuration, the first and second side areas or units 26,28 have a front end which generally corresponds to the front of the bed B of the vehicle V (i.e. opposite the open or tailgated end) and a rear end (end 32,38 as illustrated). The first and second side areas or units 26,28 have one side which extends generally along a side of the bed, and an opposing side which faces the opening 30.

In one embodiment, the height of each of the first and second side areas 26,28, the support 42, and thus the unit 20, is approximately the same as the sides of the bed B of the vehicle V. In other embodiments, the height may be lower or higher. If lower, it will be appreciated that the total amount of storage space defined by the unit 20 will be substantially reduced. If higher and a shell S is provided, the height is in one embodiment preferably still limited. Preferably, as illustrated, the top surface 44 of the unit 20 is sufficiently low that it serves as a support platform beneath the shell S. As such, equipment and other items may be located on the unit 20 but under the shell S for protection. In one embodiment, the area between the top surface 44 of the unit 20 and the shell S may serve as a sleeping berth where a bedroll 46 may be located.

Figures 3, 4:
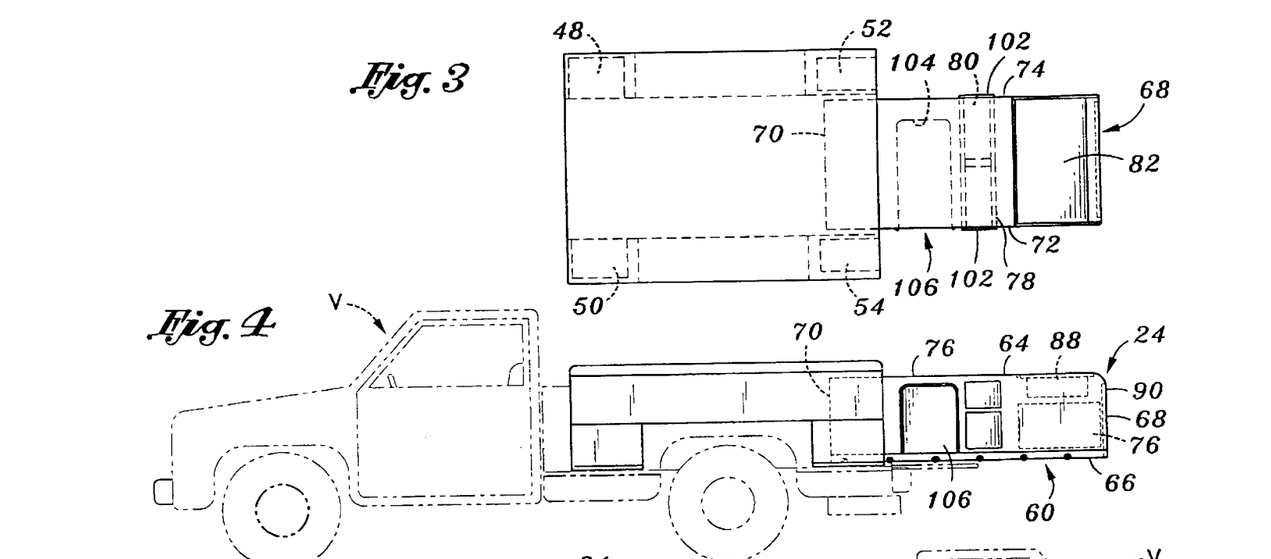
FIG. 3 is a top view of the bed portion of the vehicle illustrated in FIG. 1 with the shell removed, exposing the camping unit of the present invention.
FIG. 4 is a first side view of the camping unit illustrated in FIG. 1 with the vehicle illustrated in phantom.

Referring primarily to FIG. 3, it can be seen that in one embodiment the first side area 26 has a front storage area 50 and a rear storage area 54. The second side area 28 similarly has a front storage area 48 and a rear storage area 52. As described above, in the embodiment illustrated, the first and second side areas 26,28 are designed to fit about the wheel wells of the vehicle V, somewhat dividing each of the first and second side areas 26,28. As described, primary access to the rear storage areas 52,54 of the first and second side areas 26,28 may be at the ends 32,38 thereof, such as through the above-described doors 34,36,40. In one embodiment, the front storage area 48,50 and rear storage areas 52,54 of the first and second side areas 26,28 may be connected, as best illustrated in FIG. 1. In this regard, storage may be provided in the area between the front and rear storage areas in the area over the wheel-wells. In another embodiment, the front and rear storage areas may be separated entirely. In one embodiment, a separate access, such as through one or more doors, may be provided to the front storage area 48,50 of the first and second side areas 26,28. The door(s) or other access points may be provided along the opening 30, top 44 or the like.

Figure 5:
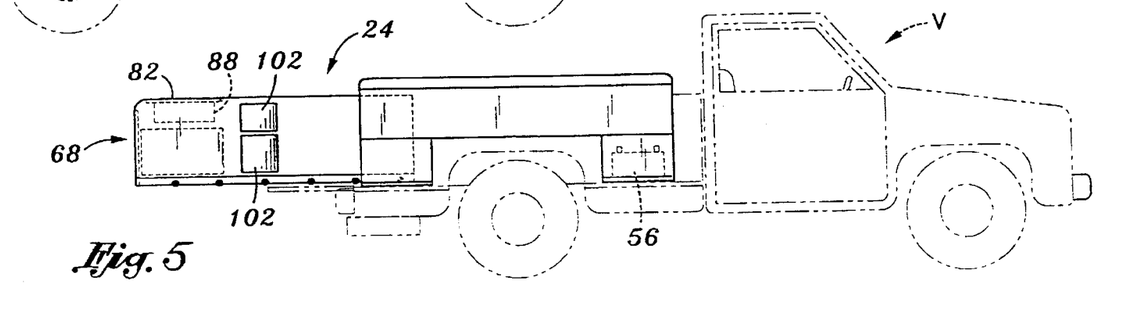
FIG. 5 is a second side view of the camping unit illustrated in FIG. 1 with the vehicle illustrated in phantom.

A variety of equipment, components or the like may be stored in the first and second side areas 26,28. As illustrated in FIG. 5, a battery 56 may, for example, be located in the front storage area 48 of the second side area 28. Additional details of the components and their location is provided below.

As described above, in one embodiment, the camping unit 20 includes a moving, and preferably sliding, compartment 24. Referring to FIGS. 1 and 2, the sliding compartment 24 is adapted to be moved between a first position in which it is located within the opening 30 defined between the first and second side areas 26,28 and the top 44 of the camping unit 20, and the bed B of the vehicle V, and a second position in which at least a portion of the sliding compartment 24 is positioned outwardly from the remainder of the camping unit 20. As illustrated in FIG. 1, when the sliding compartment 24 is in its second position, the compartment 24 preferably extends outwardly of the vehicle V. In an embodiment where the vehicle V includes a tailgate T, the tailgate T must be lowered to permit the compartment 24 to be extended.

In one embodiment, a means is provided for moving the sliding compartment 24 between its first and second positions. In one embodiment, as best illustrated in FIG. 2, this means comprises a slide mechanism 60. The slide mechanism 60 may have a variety of configurations. In one embodiment, the slide mechanism 60 includes at least one pair of rails (not shown) which are mounted to the bed B of the vehicle V. The rails may be connected in a variety of manners, such as with bolts or other fasteners. The slide mechanism 60 preferably also includes a pair of mating rails (not shown) which are connected to the compartment 24. Corresponding pairs of the rails on the bed B and the compartment 24 mate with one another. Ball bearings or the like permit the pair of rails to be moved relative to one another in a sliding motion. In one embodiment, the slide mechanism 60 includes a first mount for connection to the bed B or the like, and a pair of mating rails, one of which is attached to the mount and another of which is attached to the compartment 24, where the mating rails extend in a double-extending fashion (the both rails extend outwardly relative to the mount and then the second rail connected to the compartment 24 slides relative to the first rail).

The term "sliding" is used to describe the compartment 24 for the reason, now apparent, that in a preferred embodiment the compartment 24 may be slid on the mating rails between its first and second positions. As indicated, however, the compartment 24 may be mounted for movement in other manners, and therefor the term "sliding" is not meant to be limiting of the scope of the invention as defined by the claims. For example, instead of mounting the compartment 24 on rails, the compartment may be mounted on rollers or in any other manners that permit the compartment 24 to be moved. In one embodiment, the compartment 24 may be mounted on side rails which mate with rails mounted to the first and second side units 26,28, avoiding the need to mount rails to the bed B of the vehicle V.

In one embodiment, a means is provided for locking the sliding mechanism 60, and thus the compartment 24, in the first or non-extended position. In one embodiment, this means comprises a latch device which includes a handle 62 accessible at the end of the camping unit 20 at the rear of the bed B of the vehicle V. The latch device may operate in a wide variety of manners. In one embodiment, the handle 62 is associated with an elongate rod which is rotatable into first and second positions, one of which is associated with the locking of the rails in a fixed position, and the other which allows the rails to slide.

In one or more embodiments, the compartment 24 comprises a generally enclosed box. In a preferred embodiment, the compartment 24 is as large as possible while still fitting within the opening 30 defined by the bed B, top 44 and first and second side areas 26,28. In such an embodiment, the compartment is generally rectangular in shape. In one embodiment, the compartment 24 may have a variety of additional openings. For example, in order to reduce the weight of the compartment 24, a large portion of the rear of the top of the compartment 24 may be open.

As illustrated in FIGS. 3, 4 and 5, the compartment 24 generally has a top 64 and opposing bottom 66. The compartment 24 has a first end 68 and a second end 70, and a first side 72 and opposing second side 74. In a preferred embodiment, the compartment 24 defines one or more interior areas or compartments for containing components of the camping unit or other equipment and supplies.

In one embodiment, the sliding compartment 24 defines a first storage area 76 which is located at the first end 68 thereof. In one embodiment, the first storage area 76 is divided from a second storage area 80 by a wall 78, as described in more detail below. The first storage area 76 is thus generally defined by the two sides 72,74, the end 68, the wall 78 and the top 64 and bottom 66 of the compartment 24.

Figures 6, 7:
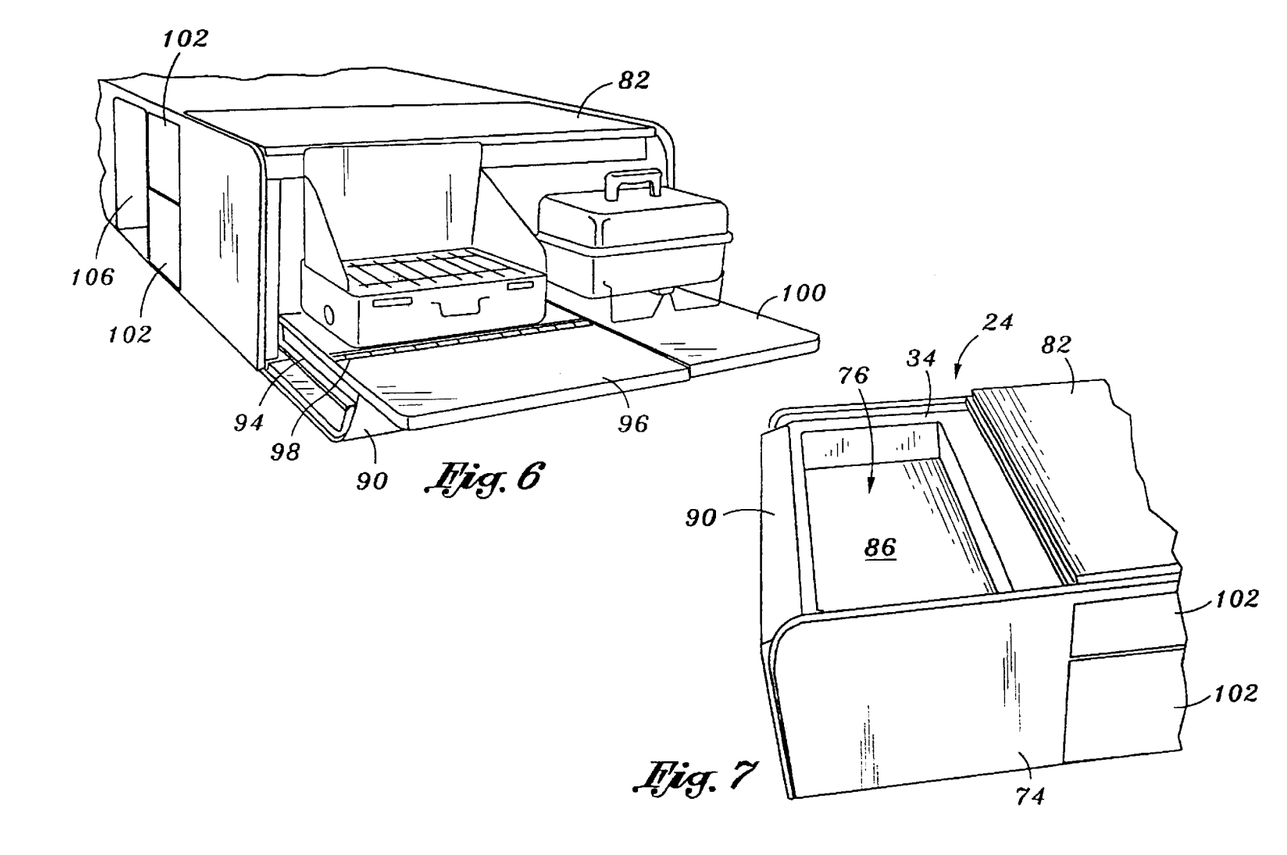
FIG. 6 is a partial perspective view of one embodiment of a sliding compartment of the camping unit of the invention.
FIG. 7 is a partial perspective view of one embodiment of a sliding compartment of the camping unit of the invention.

The first storage area 76 is preferably accessible from the top 64 of the sliding compartment 24. As best illustrated in FIG. 7, a removable panel 82 preferably provides access through the top 64. In this embodiment, a portion of the top 64 of the compartment 24 is defined by the panel 82. As illustrated, in a preferred embodiment, a support frame 84 is located under the panel 82 and generally defines an opening 86 which defines a top portion of the first storage area 76. In one embodiment, the opening 86 is generally rectangular.

In one embodiment, as best illustrated in FIGS. 4 and 5, a basket 88 or similar member may be selectively located in the opening 86 and extend into the first storage area 76. The basket 88 may be used to receive equipment or supplies, and to separate or segregate those items from remaining items located in the remainder of the first storage area 76 there below.

In a preferred embodiment, the first storage area 76 is also accessible from the end 68 of the sliding compartment 24. In one embodiment, an end cover 90 is movable between a first position in which it prevents access to the first storage area 76, as illustrated in FIGS. 1 and 2, and a second position in which access is permitted, as illustrated in FIG. 6. As illustrated in FIG. 6, in a preferred embodiment, the end cover 90 is rotatably connected to the remainder of the sliding compartment 24, such as by one or more hinges (not shown). In one embodiment, a stop (not shown) prevents rotation of the end cover 90 beyond the horizontal. The end cover 90 may then be used as a support platform for other items.

In one embodiment, one or more latching mechanisms 92 (see FIG. 1) are provided for selectively locking the end cover 90 in a closed, upright position or allowing the end cover 90 to be moved to its open position. As illustrated, the latching mechanisms 92 may comprise rotatable latch members. The latching mechanisms 92 may comprise other elements, as known to those of skill in the art In one embodiment, one or more support platforms are selectively extendable from the first storage area 76 when the end cover 90 is opened. As illustrated in FIG. 6, in one embodiment a platform 94 is adapted to be moved from a first position in which it is located in the first storage area 76 to a second position in which it extends out of the area. The platform 94 may be mounted in a sliding relationship to the sliding compartment 24 with rails, tracks or the like.

In one embodiment, a second platform (not shown) is also provided in side-by-side relationship to the first platform 94. There may be as few as one platform or more than two, and the dimensions of the one or more platforms may vary, as desired.

In one embodiment, a support 96 is associated with the first platform 94. As illustrated, the support 96 includes a first portion and a second portion connected by a hinge 98. In this configuration, the second portion of the support 96 may be folded over upon the first portion, reducing the size of the support 96 for storage on the platform 94 within the first storage area 76. On the other hand, as illustrated in FIG. 6, the second portion may be folded outwardly, increasing the total usable space of the support 96, including beyond the area occupied by the platform 94. In this manner, the support 96 is effective at forming a large support or work surface at the end of the sliding compartment 24. It is contemplated that the first and second portions of the support 96 may be stackable, slidable or the like so that they can be moved into positions where the space they occupy is reduced for storage or increased for use.

As illustrated, a similar support 100 is preferably associated with the second platform. In the embodiment illustrated, the second support 100 comprises a single element (i.e. is not hinged). It will be appreciated that either or both of the supports 96,100 may comprise a single or multiple elements.

A variety of other embodiments of supports/platforms may be provided. For example, a single large platform may be extendible from the compartment 24. One or more other supports or platforms may then be rotatable (such as by hinges) or slidable from this main platform.

In one embodiment, the second storage area 80 is occupied by a plurality of drawers 102. As illustrated in FIGS. 3–7, in one embodiment the second storage area 80 is occupied by four drawers 102, two drawers arranged in a vertical fashion at each side 72,74 of the sliding compartment 24. In one embodiment, each drawer 102 is of a standard configuration, having a front face connected to an open-top box. Each drawer 102 is movable from a first position in which it is located in the second storage area 80 to a position in which it is extended therefrom for access. As illustrated, the drawers 102 need not all be of the same size.

In one embodiment, a third storage area 104 is located adjacent to the second storage area 80 at the second end 70 of the sliding compartment 24. In one embodiment, an opening 106 is provided in the side 72 of the sliding compartment 24. The opening 106 provides access to the third storage area 104.

In one or more embodiments, the camping unit 20 includes an electrical system. The electrical system includes a power source. As illustrated in FIG. 5, in one embodiment the power source is the battery 56. The battery 56 may be positioned in various locations in the camping unit 20. As described above, in one embodiment the battery 56 is located in the forward section of one of the side areas (as illustrated, the second side area 28).

In one or more embodiments, the electrical system includes wiring (not shown) for providing power to one or more components. In one embodiment, one or more electrical sockets (not shown) may be provided for receiving mating plugs of equipment in order to power the equipment. The sockets may be positioned in various locations, such as the ends 32,38 of the camping unit 20 or the top 44 thereof, among other locations.

In one embodiment, the battery 56 is a 12 V battery. The electrical system may include a DC to AC inverter so that equipment which operates on AC current may be powered. This inverter may be located in various locations within the unit 20.

In one embodiment, the camping unit 20 includes a sound system which is preferably powered by the electrical system. The sound system may, alternatively, be powered by an independent power source, such as a battery of the vehicle V.

In one embodiment, the sound system includes a head unit 110. The head unit 110 may comprise a receiver, such as for receiving AM, FM, satellite, weather band or other radio and/or television signals. The head unit 110 may alternatively, or in addition, be adapted to utilize various forms of recorded sound media, such as Audio Compact Disc, cassette, MP3 or other formats of media. As is known to those of skill in the art, the head unit 110 may have a wide variety of configurations.

For ease of access, in one embodiment, the head unit 110 is mounted to the end 38 of the second side area 28. The head unit 110 may be mounted in other locations, however, including the first side area 26.

In one embodiment, the head unit 110 is configured to output a signal which may be converted to sound with an appropriate sound generating device. As illustrated, this device may comprise at least one speaker 112. The speaker 112 may be of a variety of types, as is well known. As illustrated, the speaker 112 is preferably located so as to direct sound outwardly from the camping unit 20, and thus the vehicle V. In one embodiment, the speaker 112 is mounted to the end 38 of the second storage area 28. Like the head unit 110, the speaker 112 may be positioned in various locations.

In a preferred embodiment, in order to minimize the complexity of electrical wiring, the head unit 110 is located in the same side area or other part of the camping unit 20 as the battery 56. In addition, to also minimize the complexity of the speaker wiring, the speaker 112 is located in the same side area or other part of the camping unit 20 as the head unit 110.

In one or more embodiments, the camping unit 20 includes a water system. In one embodiment, the water system includes at least one container (not illustrated) for storing water. The at least one water container may be located in a variety of positions in the storage unit. In one embodiment, a container is located in the second side area 28 near the end 38 thereof. The container may be of a variety of sizes and shapes, and be constructed of a variety of materials. In one embodiment, the container is constructed of plastic. The container may be constructed of Nalgene or lined with such material if the water to be contained therein is for drinking purposes.

In one embodiment, the container includes at least one inlet and at least one outlet. The inlet may comprise a fill spout which is accessible through the door 40 or other access point. In one embodiment, the outlet may comprise a spray unit (not shown).

In one embodiment, a means is provided for moving water or other liquid stored in the container from the container through the outlet. In one embodiment, this means comprises at least one electric pump (not shown). The pump may be powered by the battery 56. In one embodiment, a switch 114 is mounted at the end 38 of the second side area 28 for selectively turning on and off the pump. In one embodiment, the pump is arranged to deliver water from the container to the spray unit. In one embodiment, the spray unit includes an elongate hose which is coupled to the container and which permits the spray unit to be extended from the unit 20 for use external to the unit (such as in areas surrounding the rear of the vehicle V).

The water system may be air pressure powered, such as by introducing air through a hand pump into the container. Alternatively, the water may be drawn from the container by a gravity feed system, instead of a pump.

In one embodiment, an overflow port 116 is provided at the end 38 of the second side area 28. The overflow port 116 is linked to the container, and preferably a top portion thereof, such that overfilling of the container results not in liquid flowing into the second side area 28, but instead to the overflow port 116 and to a point external to the side area 28 and the remainder of the unit 20. In one embodiment, the port 116 may include a nipple or other fitting, such as for accepting a section of a hose which may be routed to a point far from the vehicle V and unit 20.

In one or more embodiments, more than one container may be utilized, and other water system elements, such as other hoses and fixtures, may be provided. In one embodiment, one or more containers may be located in the first side area 28. These containers may be associated with a second water system or the same system as those in the second side area 26. In one embodiment, the containers in the first side area 26 may be associated with a pump and heating element, whereby a supply of hot water is also provided. In other embodiments, a cooling unit may be provided for providing cool water. These heating and/or cooling units may be powered by the electrical system.

In one embodiment, multiple containers may be used. In another embodiment, the containers may have the form of "saddle bags" and may be somewhat flexible for spanning the space within the side areas 26,28, including the raised wheel-well section.

Figure 8:
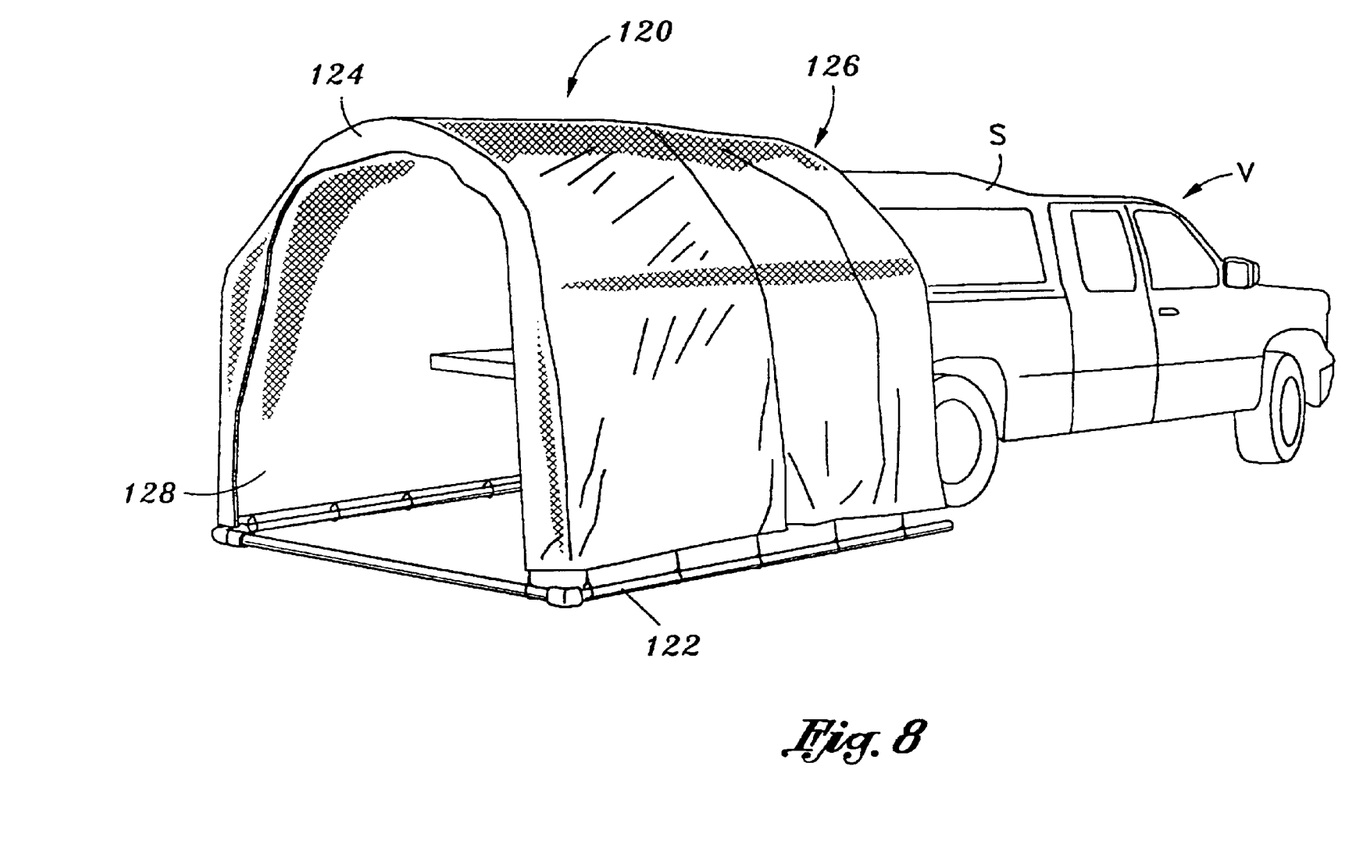
FIG. 8 is a perspective view of shelter element for use with a vehicle equipped with a camping unit in accordance with the present invention.

As illustrated in FIG. 8, in one or more embodiments, the camping unit 20 includes a shelter 120 for use therewith. The shelter 120 may have a variety of forms and constructions. In the embodiment illustrated, the shelter 120 includes a frame having a base section 122 and a plurality of upstanding arch-shaped supports (not visible). A cover 124 may selectively be located on the frame. In one embodiment, the shelter 120 has an open first end 126 and second end 128. Preferably, the first open end 126 is sufficiently large enough to permit the end of the vehicle V to be extended slightly therein. In this arrangement, the sliding compartment 24 may be extended outwardly and be entirely located within the shelter 120.

The open second end 128 of the shelter 120 permits ingress and egress. In one embodiment, a door may be provided for selectively covering the otherwise open second end 128 of the shelter 120.

In one embodiment, the shelter 120 may include a floor. The shelter 120 may also include other features, such as windows and "no-see-um" mesh permitting users to see out but keeping bugs from entering the shelter.

The frame of the shelter 120 may be constructed of a variety of materials, such as connecting fiberglass poles or even PVC pipe sections. The cover 124 is preferably constructed of a water-resistant or water-proof material which is also wind resistant and durable. For example, the cover 124 may be constructed of nylon, including nylon webbing. The cover 124 may be selectively connected to the frame 124 in a variety of manners, including stretch cords, snaps, tie-downs and the like.

A variety of alternate configurations of the camping unit 20 are contemplated as within the scope of the invention. First, although the unit 20 is described specifically for use with a pick-up type vehicle, the unit 20 may be used with, whether in a modified or unmodified form, a variety of other vehicles. For example, the camping unit 20 may be mounted to a trailer having a hitch and at least two wheels. In this embodiment, the camping unit 20 may be mounted to a frame or bed of the trailer, in similar fashion to that described above. The unit 20 may be also configured to fit vans, cargo vans, Hummers™ and other vehicles.

It will be appreciated that the camping unit 20 may be modified depending upon the specific use. For example, the size of the camping unit 20 may change dependent upon the size of the bed of the pickup, or size of the trailer or other vehicle to which the unit 20 is to be mounted. Further, the exact shape and configuration of the unit 20 may vary. As described above, for example, the vehicle may have a generally rectangular bed with no protruding wheel-wells, in which event the first and second side areas 26,28 need not have mating recessed areas.

The first and second side areas 26,28 as described above have a generally enclosed interior area. The interior area may be divided into one or more compartments, one or more of which is more or less generally enclosed. For example, direct openings may be provided to one or more of the compartments, depending on the desired use for that compartment.

In one embodiment, the camping unit 20 may include but a single side unit or area. Such an embodiment is contemplated especially when the unit is to be mounted to a trailer or located in the bed having no wheel-wells. In one embodiment, however, it is desirable to provide the unit with at least one stationary portion and at least one moving portion. For example, in another embodiment, a front stationary unit may be provided (such as corresponding to the front of the bed) and then the sliding or moving compartment provided towards the rear. In this configuration, the water and electrical systems or the like may be located in the stationary compartment, while the moving compartment can still be moved outwardly for access to the various areas thereof. There also could be more than one moving compartment, such as a pair of side-by-side compartments located in the opening, each movable independently of the other. Depending on the configuration, the movable compartment(s) could also move forward or to the front and rear (such as in the case of a trailer).

The camping unit of the invention has numerous benefits and advantages over the prior art. A primary advantage of the invention is providing storage for equipment, such as recreational equipment. At the same time, however, the unit is transportable on a vehicle. In this manner, the unit overcomes the problems associated with self-powered recreational vehicles. The unit is also removable from the vehicle. Thus, the owner of a pick-up or the like may store their equipment in the unit, but only have the unit occupy the bed of their vehicle when desired. In this regard, the entire unit may be removed from the bed of the vehicle. In one embodiment, the unit may be fitted with wheels (such as including passages for mounting casters) so that the unit may be rolled to storage when removed from the vehicle.

An advantage of the unit is that a user need not pack and store equipment between camping or other trips. Instead, the equipment is all conveniently packed and stored at the unit. Because the unit is weather-tight, it can be stored and used outdoors. This reduces maintenance and overhead costs and expenses.

The unit has a number of particular advantages. First, the sliding compartment of the unit permits access to the great amount of storage area which would otherwise be relatively inaccessible in the interior of the unit. As described, the user may slide the unit outwardly relative to the side units or areas, thereby providing access to the sides and top of the sliding compartment. In the embodiment illustrated, in this extended position a user has access to drawers and a front interior area of the sliding compartment. In addition, the user may remove a portion of the top panel and gain access to a rear interior portion of the sliding compartment.

The unit also takes advantage of the areas of a vehicle normally made unusable by the upwardly extending wheel-wells. As described, in one embodiment the first and second side units provide storage, as well as additional features such as an electrical, sound and water system. These units are designed to occupy the space around the wheel-wells.

In one embodiment, the unit includes a variety of platforms upon which equipment may be used. For example, as illustrated in FIG. 6, the supports 96,100 may be extended to provide supports for a camp stove, food, a hibachi and a wide range of other equipment and items. These platforms or supports are advantageously accessible remote from the rear of the vehicle because of the extendability of the sliding compartment. Thus, the rear of the vehicle, including the tailgate, does not interfere with use of these features.

As described, the unit includes a variety of additional features, such as an electrical, water and sound system. These features self contain a variety of independent equipment which would otherwise be necessary to the recreationalist.

In one embodiment, the unit has a top surface which serves as a sleeping berth, eliminating the need for a tent. The unit may also be used with a specially designed shelter which is arranged to extend over at least the outwardly extended sliding unit.

In general, the unit provides a large number of independent features which, when assembled, provide unique functionality. This functionality includes ability to permanently store equipment, easily access equipment during use, providing access to electricity and water, providing storage and supports for use of equipment, such as while cooking, and providing a support for sleeping. When combined with the shelter, the unit can be used in inclement weather, including rain and wind.

It will be understood that the above described arrangements of apparatus and the method therefrom are merely illustrative of applications of the principles of this invention and many other embodiments and modifications may be made without departing from the spirit and scope of the invention as defined in the claims.

I claim:

1. A storage unit adapted to be mounted to a vehicle for transport comprising:
    a first side unit, said first side unit having a front end and a rear end, said first side unit defining at least one generally enclosed compartment and including at least one access door located at said rear end;
    a second side unit, said second side unit having a front end and a rear end, said second side unit defining at least one generally enclosed compartment and including at least one access door located at said rear end;
    said first and second side units spaced from one another and defining an opening there between;
    a top extending over said opening between said first and second side units; and
    a sliding compartment, said sliding compartment mounted upon at least one rail permitting said sliding compartment to be moved from a first position in which said sliding compartment is located within said opening below said top and between said first and second side units, and a second position in which at least a portion of said sliding compartment is moved outwardly of said opening, said sliding compartment including a front end and a rear end, said sliding compartment defining a generally enclosed interior area, at least a portion of said rear end of said sliding compartment movable from a first position in which access to said interior area is inhibited, and a second position in which access to said interior area is permitted.

2. The storage unit in accordance with claim 1 wherein said rear end of said sliding compartment comprises a hinged gate rotatable from a first upwardly extending position to a second outwardly extending position, said gate in said outwardly extending position forming a support surface.

3. The storage unit in accordance with claim 1 wherein said sliding compartment includes a first side and an opposing second side and at least one drawer associated with each of said sides, said drawers in a first position located within said interior area and in a second position extending at least partially therefrom for access thereto.

4. The storage unit in accordance with claim 1 wherein said sliding compartment includes a top, at least a portion of said top formed as a removable panel, said removable panel when removed permitting access to said interior area.

5. The storage unit in accordance with claim 1 wherein said removable panel is located adjacent to said rear end of said sliding compartment.

6. The storage unit in accordance with claim 1 including at least one platform, said platform located in said interior area of said sliding compartment, said platform extendable outwardly of said rear end of said sliding compartment.

7. The storage unit in accordance with claim 1 wherein said sliding compartment includes a first side and a second side, and an opening formed in one of said sides towards said front end thereof permitting access to said interior area of said sliding compartment.

8. The storage unit in accordance with claim 1 wherein said first storage area and second storage area each include an upwardly extending area between said front and rear end thereof for accepting a wheel well of a vehicle therein.

9. The storage unit in accordance with claim 1 wherein said storage unit includes an electrical system, said electrical system including at least one battery, said battery located in said at least one generally enclosed compartment of said first or second side area, and at least one electrical receptacle.

10. The storage unit in accordance with claim 9 including a sound system, said sound system including a head unit powered by said electrical system, said head unit mounted to said rear end of said first or second side area and at least one speaker located adjacent said head unit.

11. The storage unit in accordance with claim 1 wherein said storage unit is adapted to fit within the bed of a vehicle, said first and second side units and sliding compartment having a length approximately the same as a length of said bed, said sliding compartment movable to a position in which said rear end thereof is located outwardly of a rear end of said bed.

12. The storage unit in accordance with claim 11 wherein said sliding compartment is mounted to at least one first pair of rails, said rails slidably mounted to at least one mating second pair of rails connected to said bed of said vehicle.

13. The storage unit in accordance with claim 12 including a latching mechanism adapted to selectively maintain said sliding compartment in said first position within said opening.

14. The storage unit in accordance with claim 1 wherein said first side area includes a first access door and a second access door, said first and second access doors vertically oriented at said rear end of said first side area.

15. The storage unit in accordance with claim 1 including a water system, said water system including at least one container located in one of said side areas and including a pump arranged to draw fluid from said container and deliver it to an outlet.

16. The storage unit in accordance with claim 15 wherein said outlet comprises a fluid line extendable from said interior of said side area in which said at least one container is located.

17. The storage unit in accordance with claim 1 wherein said storage unit is mounted to a vehicle comprising a trailer having a tongue for connection to a hitch and at least two supporting wheels.

18. The storage unit in accordance with claim 1 including a shelter, said shelter comprising a frame having a base and a plurality of upwardly extending supports and a cover for mounting upon said supports, said shelter having a generally open first end in which said sliding unit may be extended under said cover.

19. In combination, a vehicle having a bed having a front end, a rear end and a pair of upwardly extending sides, and a camping unit comprising a base including a first and a second side unit spaced to define an opening there between, a top extending over said opening, a central compartment, means for moving said compartment from a first position in which said central compartment is located in said opening and a second position in which said central compartment is extended from said opening, said first and second side units each having a recessed area for accepting an upwardly extending wheel-well of said vehicle bed therein, said first and second side units and central compartment all defining one or more interior areas which are generally enclosed for storing equipment.

20. The combination in accordance with claim 19 wherein said means comprises at least one rail mounted to said bed and at least one rail mounted to said central compartment, said rails moveable with respect to one another in a sliding relationship.

* * * * *